(12) United States Patent
Agrawal et al.

(10) Patent No.: US 7,870,163 B2
(45) Date of Patent: Jan. 11, 2011

(54) IMPLEMENTATION OF BACKWARD COMPATIBLE XML SCHEMA EVOLUTION IN A RELATIONAL DATABASE SYSTEM

(75) Inventors: Abhyudaya Agrawal, San Francisco, CA (US); Thomas Baby, Foster City, CA (US); Nipun Agarwal, Santa Clara, CA (US); Sam Idicula, San Jose, CA (US); Ravi Murthy, Fremont, CA (US); Eric Sedlar, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 3 days.

(21) Appl. No.: 11/540,341

(22) Filed: Sep. 28, 2006

(65) Prior Publication Data

US 2008/0082560 A1    Apr. 3, 2008

(51) Int. Cl.
*G06F 17/30* (2006.01)
(52) U.S. Cl. ..................... 707/802; 707/803
(58) Field of Classification Search ............. 707/802, 707/803
See application file for complete search history.

(56) References Cited

U.S. PATENT DOCUMENTS

| | | | |
|---|---|---|---|
| 5,649,200 A | | 7/1997 | Leblang et al. |
| 6,016,497 A | * | 1/2000 | Suver ..................... 707/103 R |
| 6,035,297 A | * | 3/2000 | Van Huben et al. ............ 1/1 |
| 6,047,322 A | | 4/2000 | Vaid et al. |
| 6,131,098 A | * | 10/2000 | Zellweger ................. 1/1 |
| 6,243,709 B1 | * | 6/2001 | Tung .................... 707/802 |
| 6,298,350 B1 | * | 10/2001 | Lakayev et al. ............ 1/1 |
| 6,349,306 B1 | * | 2/2002 | Malik et al. ............... 1/1 |
| 6,424,969 B1 | * | 7/2002 | Gruenwald ............... 1/1 |

(Continued)

FOREIGN PATENT DOCUMENTS

EP        0 856 803        8/1998

(Continued)

OTHER PUBLICATIONS

Chien et al., "Copy-Based versus Edit-Based Version Management Schemas for Structured Documents" Computer Science Department, UCLA. Department of Computer Science and Engineering, UC Riverside, Unkwown Date (8 pages).

(Continued)

*Primary Examiner*—Don Wong
*Assistant Examiner*—Kim T Nguyen
(74) *Attorney, Agent, or Firm*—Hickman Palermo Truong Becker LLP

(57) ABSTRACT

In-place XML schema evolution occurs by evaluating an existing XML schema in a database system to see if it is compatible with a new XML schema. To determine if the old schema is compatible with the new schema, a lock-step traversal is performed on the two schemas. Each instruction in the old schema is compared to instructions in the new schema. Detected differences between the two schemas are evaluated to determine if existing XML documents are still compatible with the new schema. If they are, then an in-place schema evolution operation can take place. The in-place schema operation basically, involves appending the updated object information to the underlying object type and preserving the order of elements in a document by storing element mapping information on disk.

24 Claims, 6 Drawing Sheets

U.S. PATENT DOCUMENTS

| | | | |
|---|---|---|---|
| 6,473,765 | B1 | 10/2002 | Fink |
| 6,523,036 | B1 * | 2/2003 | Hickman et al. .................... 1/1 |
| 6,553,383 | B1 * | 4/2003 | Martin ............................... 1/1 |
| 6,574,635 | B2 * | 6/2003 | Stauber et al. ..................... 1/1 |
| 6,587,856 | B1 * | 7/2003 | Srinivasan et al. .......... 707/802 |
| 6,636,845 | B2 | 10/2003 | Chau et al. |
| 6,763,359 | B2 * | 7/2004 | Lohman et al. ............. 707/718 |
| 6,772,180 | B1 | 8/2004 | Li et al. |
| 6,785,690 | B1 * | 8/2004 | Davidson .................... 707/802 |
| 6,820,135 | B1 | 11/2004 | Dingman et al. |
| 6,826,568 | B2 * | 11/2004 | Bernstein et al. ................... 1/1 |
| 6,845,380 | B2 | 1/2005 | Su et al. |
| 6,847,974 | B2 | 1/2005 | Wachtel |
| 6,847,978 | B2 * | 1/2005 | Ellis et al. ................... 707/713 |
| 6,917,935 | B2 * | 7/2005 | Zwiegincew et al. ........ 707/803 |
| 6,941,511 | B1 | 9/2005 | Hind et al. |
| 6,954,758 | B1 * | 10/2005 | O'Flaherty ......................... 1/1 |
| 6,957,230 | B2 * | 10/2005 | Cameron et al. ............ 707/803 |
| 6,961,734 | B2 * | 11/2005 | Kauffman ................... 707/803 |
| 6,970,876 | B2 * | 11/2005 | Hotti et al. ................... 707/634 |
| 7,016,902 | B2 * | 3/2006 | El-Shimi et al. ......... 379/88.12 |
| 7,028,028 | B1 * | 4/2006 | Balmin et al. .............. 707/760 |
| 7,031,956 | B1 * | 4/2006 | Lee et al. ....................... 707/3 |
| 7,036,072 | B1 | 4/2006 | Sulistio et al. |
| 7,043,487 | B2 | 5/2006 | Krishnamurthy et al. |
| 7,072,879 | B2 * | 7/2006 | Soemo et al. ...................... 1/1 |
| 7,089,266 | B2 * | 8/2006 | Stolte et al. ....................... 1/1 |
| 7,089,491 | B2 | 8/2006 | Feinberg et al. |
| 7,146,399 | B2 | 12/2006 | Fox et al. |
| 7,225,411 | B1 | 5/2007 | Stoner et al. |
| 7,370,270 | B2 | 5/2008 | Fent |
| 7,395,271 | B2 | 7/2008 | Idicula et al. |
| 2002/0007363 | A1 | 1/2002 | Vaitzblit |
| 2002/0169788 | A1 * | 11/2002 | Lee et al. ................. 707/104.1 |
| 2002/0174142 | A1 | 11/2002 | Demers et al. |
| 2003/0120665 | A1 | 6/2003 | Fox et al. |
| 2003/0140308 | A1 | 7/2003 | Murthy et al. |
| 2004/0064825 | A1 | 4/2004 | Lim et al. |
| 2004/0083218 | A1 | 4/2004 | Feng |
| 2004/0215656 | A1 | 10/2004 | Dill et al. |
| 2004/0216030 | A1 | 10/2004 | Hellman et al. |
| 2004/0268240 | A1 * | 12/2004 | Vincent, III ................. 715/513 |
| 2005/0050105 | A1 | 3/2005 | Idicula et al. |
| 2005/0228800 | A1 | 10/2005 | Dettinger et al. |
| 2006/0259458 | A1 | 11/2006 | Hunter et al. |
| 2007/0198659 | A1 | 8/2007 | Lam |
| 2007/0203931 | A1 | 8/2007 | Ukelson et al. |
| 2008/0082560 | A1 | 4/2008 | Agrawal et al. |

FOREIGN PATENT DOCUMENTS

WO  WO 03/030031  4/2003

OTHER PUBLICATIONS

Guerrini et all, "Impact of XML Schema Evolution on Valid Documents" WIDM'05, Nov. 5, 2005, Bremen, Germany, ACM Copyright 2005 (6 pages).

Guerrini et al., "XML Schema Evolution: Incremental Validation and Efficient Document Adaption" DISI—Universit'a degli Studi di Genova, Italy, Unknown Date (10 pages).

Klettke, "Conceptual XML Schema Evolution the CoDEX approach for Design and Redesign" University of Greifswald, Germany, Unknown Date (11 pages).

Oracle, "Oracle IFS (Internet Filing System)", Technical Data Sheet, Mar. 1999, 4 pages.

Ipedo, Inc., "Ipedo XML Database 3.1: Developer's Guide," 2001, XP-002306148, 12 pages.

Parkerson, Chris, "Ipedo XML Database 3.1 Now Available," Jul. 22, 2002, XP-002306149, pp. 1-2.

Turker, Can, "Schema Evolution in SQL-99 and Commercial (Object-) Relational DBMS," 9$^{th}$ International Workshop on Foundations of Models and Languages for Data and Obejcts Fomlado/Demm 2000, Sep. 18, 2000, XP-002306150, 30 pages.

Su, Hong, et al., "XEM: XML Evolution Management," Jan. 2002, XP-002306151, pp. 1-32.

Wang, Yuan, et al., "X-Diff: An Effective Change Detection Algorithm for XML Documents," Proceedings of the 19$^{th}$ International Conference on Data Engineering (ICDE'03), 2003, IEEE, pp. 519-530.

Awais, Rashid, "A Framework for Customisable Schema Evolution in Object-Oriented Databases," Proceedings of the Seventh International Database Engineering and Applications Symposium (IDEAS'03), 2003, IEEE, 5 pages.

Xue, Li, "A Survey of Schema Evolution in Object-Oriented Databases," 1999, IEEE, pp. 362-371.

Mahhavan, Jayant, et al., "Generic Schema Matching With Cupid," Aug. 2001, Technical Report, Microsoft Research, Microsoft Corporation, Redmond, WA, 15 pages.

Rahm, Erhard, et al., "On Matching Schemas Automatically," Feb. 2001, Technical Report, Microsoft Research, Microsoft Corporation, Redmond, WA, pp. 1-21.

Guerrini, Giovanna, et al. "XML Schema Evolution," Unknown date, University of Genova, Italy, pp. 1024.

* cited by examiner

```
<xsd:complexType name="USAddress">
    <xsd:sequence>
        <xsd:element name="name" type="xsd:string"/>
        <xsd:element name="street" type="xsd:string"/>
        <xsd:element name="state" type="xsd:string"/>
        <xsd:element name="zip" type="xsd:decimal"/>
    </xsd:sequence>
    <xsd:attribute name="country" type="xsd:NMTOKEN" fixed="US"/>
</xsd:complexType>
```

```
<xsd:complexType name="USAddress">
    <xsd:sequence>
        <xsd:element name="name" type="xsd:string"/>
        <xsd:element name="street" type="xsd:string"/>
112     <xsd:element name="city" type="xsd:string" minOccurs=0/>
        <xsd:element name="state" type="xsd:string"/>
        <xsd:element name="zip" type="xsd:decimal"/>
    </xsd:sequence>
    <xsd:attribute name="country" type="xsd:NMTOKEN" fixed="US"/>
</xsd:complexType>
```

| PD 310 | Name (0) | Street (1) | State (2) | ZIP (3) |
|---|---|---|---|---|
| 0,1,2,3 | A | ABCD | CA | 12345 |
| 2,1,3,0 | B | EFGH | CA | 12345 |
| ... | | | | |

| PD 330 | Name (0) | Street (1) | State (2) | ZIP (3) | City (4) |
|---|---|---|---|---|---|
| 0,1,2,3,4 | A | ABCD | CA | 12345 | |
| 2,1,3,4,0 | B | EFGH | CA | 12345 | |
| 0,1,2,4,3 | C | IJKL | CA | 12345 | SAN JOSE |
| 1,2,3,4,0 | D | MNOP | DE | 67890 | DOVER |

FIG. 5

```
<xsd:complexType name="USAddress">
    <xsd:sequence>
        <xsd:element name = "name" type="xsd:string" xdb:propNumber="2653"/>
        <xsd:element name="street" type="xsd:string" xdb:propNumber="2654"/>
        <xsd:element name="city" type="xsd:str ing" minOccurs=0 xdb:propNum"=2681"/>
        <xsd:element name="state" type="xsd:string" xdb:propNumber="2655"/>
        <xsd:element name="zip" type="xsd:decimal" xdb:propNumber="2656 "/>
    </xsd:sequence>
    <xsd:attribute name="country" type="xsd:NMTOKE N" fixed="US"
    xdb:propNumber="2652"/>
<xsd:annotation>
    <xsd:appinfo>
        <xdb:kidList>
            <xdb:kid propNum="2653" kidNum=" 0"/>
            <xdb:kid propNum="2654" kidNum="1"/>
            <xdb:kid propNum="2655" kidNum="2"/>
            <xdb:kid propNum="2656" kidNum="3"/>
            <xdb:kid propNum="2652" kidNum="4"/>
            <xdb:kid propNum="2681" kidNum="5"/>
        </xdb:kidList>
    </xsd:appinfo>
</xsd:annotation>
</xsd:complexType>
```

510

IMPLEMENTATION OF BACKWARD COMPATIBLE XML SCHEMA EVOLUTION IN A RELATIONAL DATABASE SYSTEM

RELATED APPLICATIONS

The present application is related to U.S. patent application Ser. No. 11/521,907, filed on Sep. 15, 2006, entitled "EVOLUTION OF XML SCHEMAS INVOLVING PARTIAL DATA COPY," filed by the applicants for which applications are Baby, et al., which application is incorporated by reference in its entirety for all purposes as though fully and originally disclosed herein.

The present application is related to U.S. patent application Ser. No. 11/519,720, filed on Sep. 11, 2006, entitled "MANAGEMENT OF COMPLEX XML SCHEMAS IN A DATABASE SYSTEM," filed by the applicants for which applications are Agrawal, et al., which application is incorporated by reference in its entirety for all purposes as though fully and originally disclosed herein.

This application is related to U.S. patent application Ser. No. 10/259,278, entitled "MECHANISM FOR MAPPING XML SCHEMAS TO OBJECT-RELATIONAL DATABASE SYSTEMS", filed by Ravi Murthy et al. on Sep. 27, 2002, the entire contents of which is hereby incorporated by reference for all purposes as if fully set forth herein.

BACKGROUND

An XML schema in an XML-type database defines the structure of instance XML documents inserted into a database. Instance XML documents are XML documents inserted into the XML-type database that conform to the XML schema. In an object-relational database system, the XML schema is used to determine the in-memory layout of the instance XML documents, as well as the database structures of the database representation in which XML documents are stored in the database system.

The database structures of a database representation of an XML schema are referred to herein as "base database structures." Base database structures include, for example, table columns that each represent an element of an XML schema or object type tables whose object type attributes correspond to elements of the XML schema.

The in-memory layout of the instance XML documents is based in large part on the individual elements and attributes defined by the XML schema. However, an instance XML document does not need to be stored object-relationally on disk for it to have an XML schema-based in-memory layout. For example, an instance XML document may be stored on disk in a CLOB (Character Large Object), and yet its in-memory layout is still determined by the XML schema.

Once XML documents are stored in a database, a client application can perform queries on the database based on elements and attributes of the schema. Suppose, however, that the client application accessing the database changes. Often a change to a client application entails changes to an XML schema and its associated base database structures to maintain compatibility with the client application as changed. The procedure for making such changes to an XML schema and its associated base database structures is called schema evolution. One approach for performing schema evolution is copy-based evolution.

Copy-based evolution is a resource intensive technique that backs up all the data stored in tables associated with the evolving XML schema, deletes the old version of the XML schema (which deletes its associated base database structures), registers the new version of the XML schema (which creates new base database structures), and re-inserts the backed up data into the newly created structures. As part of re-inserting the backed up data into the new base database structures, the database system may apply a transformation on the data (e.g., in the form of an XSLT) to conform the data (e.g., XML documents) to the new version of the XML schema.

Although, copy-based evolution can update an XML schema, there are problems with its approach. For instance, copy-based evolution requires the database system to back up, transform, and restore the entire set of XML documents associated with an XML schema (e.g., both conforming and non-conforming XML documents) even though the change to the XML schema may be minimal or only affect a few documents. As a result, in large database systems, copy-based evolution may necessitate long downtimes.

In addition, there are some situations in which XML documents may be transformed during the copy-based evolution to conform the documents to the new version of the XML schema. Transforming XML documents is a time-consuming process. The reason the transformation process is time-consuming is that it involves copying each XML document in its entirety (instead of just those portions of the document that are affected by the XML schema changes) into memory before inserting new information into the document. Moreover, once the transformation is complete, the transformed document is copied as a whole back into the updated database.

Further, schema evolution operations can drastically change the base database structures of the underlying database. Any changes to the database or its base structures can also affect the actual underlying storage of the XML documents on disk. Changes to the underlying storage add more complexity to an operation and increase its execution time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which:

FIG. 1A is an example of XML schema code;

FIG. 1B is an example of updated XML schema code;

FIG. 5 is an example of annotated XML schema code, according to an embodiment of the invention;

DETAILED DESCRIPTION

Figure 2:
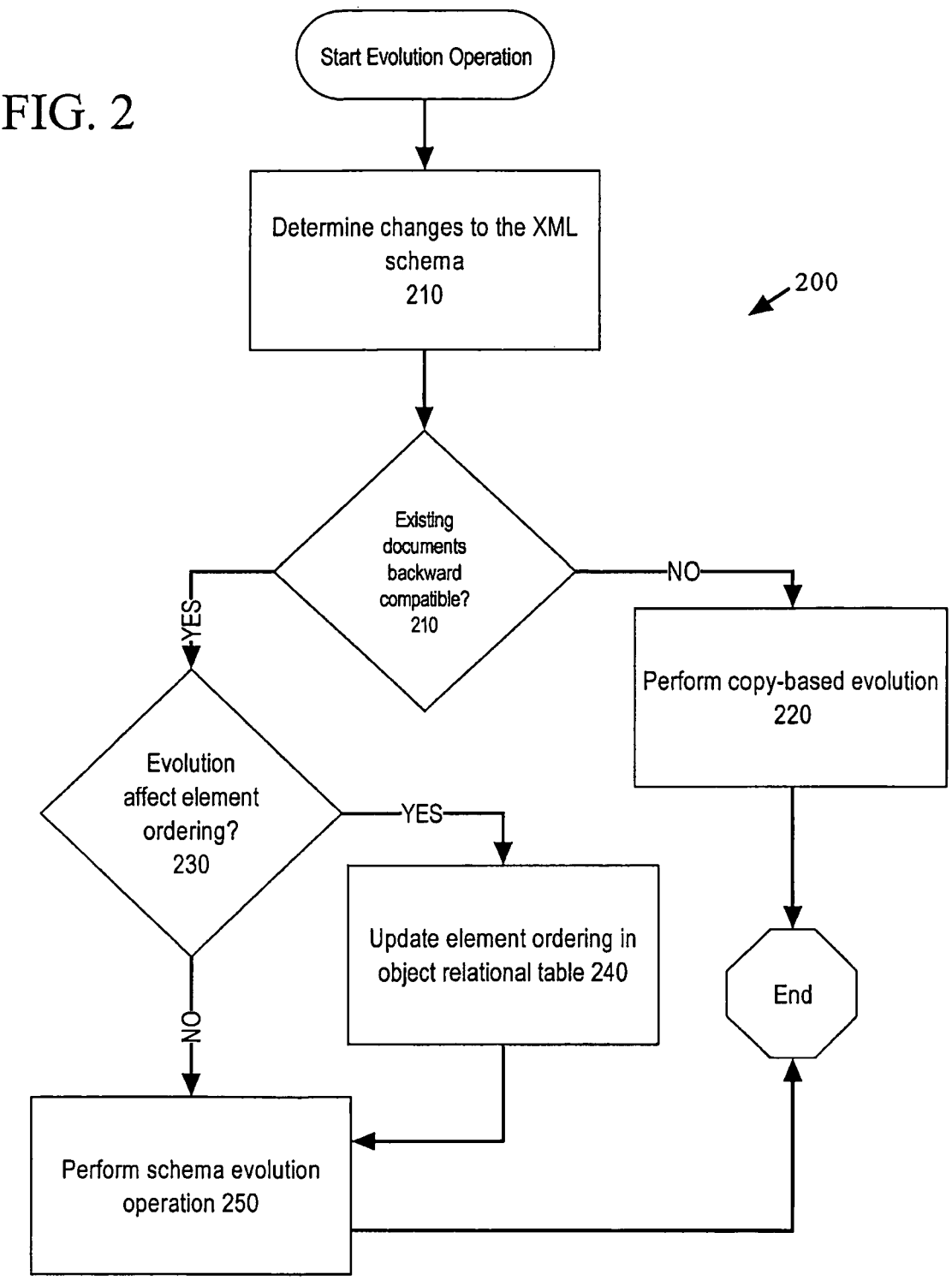
FIG. 2 is a flowchart illustrating steps to perform a schema evolution operation on a backward compatible schema, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Mechanisms described herein perform in-place XML schema evolutions. The mechanisms perform the in-place schema evolution by evaluating an existing XML schema in a database system to see if it is compatible with a new XML schema. In an embodiment, mechanisms perform an additional check to see if the schema evolution operation can be performed in a reasonable amount of time.

To determine if the existing XML schema is compatible with the new XML schema, in an embodiment, a mechanism traverses the two schemas, comparing instructions in the old schema to instructions in the new schema. When the lines differ, mechanisms note the change. For example, an old XML schema defines a Person object that includes a name, an address, a height, a weight, and a hair color element. Subsequently, the XML schema is updated to add an optional eye color element to the Person object. When the mechanisms perform the traversal of both schemas, it is determined that the new schema has the optional eye color element. Accordingly, the mechanisms evaluate the change to determine if the existing instance XML documents are compatible with the new schema. In this example, the existing instance XML documents already have every non-optional element of the XML schema (otherwise they would not have been inserted into the database in the first place). Thus, the existing instance XML documents are compatible with the new schema. In other words, since eye color is an optional element (e.g., an element that does not need to be present in an XML document even under the new schema), the existing instance documents still contain all the necessary information to be compatible with the new XML schema.

Once it has been determined that a schema evolution operation is backwards compatible, in an embodiment, mechanisms check to see if the modification to the schema will be resource expensive to perform. For example, if the modification to the schema adds a new enumeration value, the process of updating not only the database but all of the corresponding indices for the database can be expensive. Thus, in one embodiment, the schema evolution operation may be postponed until the database can be taken offline.

In one embodiment, mechanisms described herein maintain existing document ordering by maintaining and updating mapping information on disk during a schema evolution operation.

Backward Compatible XML Schema

Compatibility generally refers to the notion of whether existing documents are capable of being used without modification with a new XML schema. A backward compatible XML schema is an XML schema that is compatible with existing instance XML documents (e.g., documents that were inserted prior to a request to perform a schema evolution operation). The database system may determine the backward compatibility of an XML schema by comparing it to a previous XML schema or to the instance XML documents stored in the database. The process of comparing two schemas is discussed in more detail below in connection with FIG. 2.

To illustrate an example of a backward compatible schema, consider the XML schema code 100 shown in FIG. 1A and the XML schema code 110 shown in FIG. 1B. In this example, code 100 is part of a much larger XML schema definition. The illustrated portion of code 100 defines a complex type called U.S. Address that includes the following four elements: Name, Street, State, and Zip. When XML schema code 100 is registered in a database system, the database system creates an object with attributes Name, Street, State, and Zip and implements base database structures for each attribute. In one embodiment the object created is an object-relational table and the attributes correspond to columns in the object-relational table. Accordingly, when the XML schema code 100 has been registered and the base database structures created, instance XML documents conforming to schema 100 may be inserted into the database. Basically, each instance XML document inserted into the database includes Name, Street, State, and Zip data.

At some point, it may be useful (or even necessary) to evolve XML schema code 100 to add, remove, or modify elements in a schema. For instance, in FIG. 1A, complex type U.S. Address is updated to add an optional City element. Accordingly, a schema evolution operation is invoked to add the optional City element to the complex type illustrated in XML schema code 100. The resulting change to XML schema code is illustrated in FIG. 1B. In FIG. 1B, new XML schema code 110 illustrates the optional City element 112. Note that the new element includes a "minOccurs" attribute set to zero. The minOccurs attribute, when set to zero, indicates to the database system that the schema element is optional.

In one embodiment, if all the changes to an XML schema are optional then the new XML schema is backward compatible with the existing XML documents. For example, in FIG. 1B, since the added City element is optional, City does not need to be specified in an instance XML document in order for the document to conform to the new XML schema. Therefore, even though existing instance XML documents do not include a City, they conform to the new XML schema because the new XML schema does not require that information. Accordingly, the new XML schema is backward compatible with existing instance XML documents. Therefore, an in-place schema evolution can take place. Accordingly, the database system calls the appropriate low-level database instructions to append a new column to the U.S. Address object-relational table. Then, subsequent XML documents that include City information can be added to the database.

In another example, assume in the U.S. Address complex type was initially constrained to the lower 48 contiguous states. In one embodiment, a schema evolution operation expands that range to all fifty states. According to one embodiment, the new schema is backward compatible, since the state information in the existing XML documents all have fall within the expanded fifty state range.

It should be noted that, according to an embodiment, before performing the in-place schema evolution operations, the database system may evaluate whether the base database structures can be evolved in constant time (e.g., without dramatically affecting the overall performance of the database system). For the majority of cases, when the schema update is backward compatible, the schema evolution operation should be able to perform in constant time. However, to protect against those few instances where that may not be possible, the database system can be written to recognize those few specific instances. For example, when an enumeration is added, removed, or modified, not only will the base database structures be modified, but indices and other values as well. Thus, the database system may be written to detect an update to enumerated values in the schema and postpone the schema evolution operation.

In-Place Schema Evolution

When an XML schema definition is registered with a database system, elements and attributes from the XML schema are used to define columns in an object relational database associated with the schema. Accordingly, when an instance XML document is added to the database, the new document is shredded into its basic elements and, if it conforms to the schema, a new row in the object relational database is created so the information extracted from the document can be inserted into the appropriate columns. After, the schema has been registered and instance XML documents inserted into the database, in one embodiment, it may be necessary to modify the underlying XML schema. To modify an existing schema, a schema evolution operation is invoked by a user on the database system. According to one embodiment, when the user submits a schema evolution operation, it is analyzed by the database system to determine if the resulting XML schema is backward compatible with the existing XML documents in the database. If the new schema is backward compatible, in one embodiment, in-place schema evolution takes place.

Example Procedure for Performing In-Place Evolution

FIG. 2 is a flowchart illustrating the procedure 200 for performing an in-place schema evolution. The process begins when a user invokes a schema evolution operation on the database system. A schema evolution operation may modify an XML schema in a variety of ways, for example, adding elements, removing elements, or modifying existing elements in a schema.

In one embodiment, the database system begins the process of comparing an old XML schema to a new schema to find changes between the two schemas. To illustrate the procedure, reference is made to the XML schema code illustrated in FIGS. 1A and 1B. As described above, FIG. 1A illustrates XML schema code 100 corresponding to a prior version of U.S. Address complex type. FIG. 1B illustrates XML schema code 110 corresponding to an updated version of the U.S. Address complex type.

Collect Changes to the Schema

At step 210 in procedure 200, the database system begins traversing the old XML schema code 100 and the new XML schema code 110 in lock-step. A lock-step traversal of both schemas starts at the top of the schema and compares the first instruction in the old schema to the first instruction in the new schema. If the instructions are the same, then the next instruction in the old schema is compared to the next instruction in the new schema. This traversal of the instructions continues until a difference is found between the two schemas.

When a difference in the two schemas is detected by the database system, the database system records the difference and continues to evaluate the remainder of the instructions in the schemas for further changes. The traversal ends when every instruction in both schemas has been evaluated.

In one embodiment, a different technique may be used to detect changes between two schemas. For example, the database system may simply look at the first instruction in the new schema and then search the entirety of the old schema for a similar instruction. Alternatively, the database system could generate a grammar tree of the elements in the two schemas and compare leaf nodes.

In the end, the database system captures the differences between the two schemas and uses the captured information to determine what changes need to be made to the base database structures themselves. For example as the database system traverses old XML schema code 100 and new XML schema code 110, it determines that City element 112 is present in the new schema code 110, but not in the old schema code 100. Moreover, the database system determines that City element 112 has an attribute associated with it called minOccurs. MinOccurs is set to zero. In one embodiment, when the minOccurs value is set to zero that means the corresponding element in the XML schema is an optional element (e.g., it does not need to be present for an XML document to conform to the new schema). The database system records the change and continues to traverse both schemas until all changes have been found or until the traversal function reaches the end of both schemas.

In this example, the only change is the addition of optional City element 112 to the new XML schema 110.

Determine the Backward Compatibility of the New Schema

At step 220, the database system performs analysis on the detected changes to determine if the new XML schema is backward compatible with existing instance XML documents. In one embodiment, the process of determining if a new schema is backward compatible is keyed by certain attributes and values within the new schema itself. For example, in FIG. 1B, the City element is an optional element. Accordingly, it does not need to be present in an XML document to still conform to the new schema. Since the City element 112 is optional, the constraints imposed by the new element are not violated by the existing XML documents. Basically, in this embodiment, every XML document that conformed to the old schema also conforms to the new schema. Assuming, that the schema evolution operation can complete without dramatically affecting database performance, the in-place schema evolution operation takes place. Note that other factors may be used to determine backward compatibility, such as a value range and other non-essential elements and attributes.

In one embodiment, if the new XML schema contains new elements that are not backward compatible with existing XML documents. For example, City element is added to the U.S. Address complex type and the City element has a minOccurs value of one, then at step 230, copy-based evolution is used to update the existing XML documents and add a City column to the underlying database structure.

Determine the Effect on Element Ordering

In one embodiment, the new XML schema is backward compatible with the existing instance XML documents. Accordingly, in FIG. 2, at step 240, the database system determines whether the detected changes between the new and old XML schema affect the ordering of elements in the stored instance XML documents. For example, elements, as well as attributes and other values, in an XML schema are often listed in a particular way in order to preserve the sequence of the elements in the XML documents. XML documents inserted into a particular XML schema-based database often have to conform to the sequence of elements defined by a schema. This is particularly true if the XML schema defines a "sequence" content model for a complex type. A sequence model requires that every element in a complex type be listed in the same order they are listed in the XML schema. For instance, since U.S. Address illustrated in FIG. 1A includes a sequence model, the elements in an XML document conforming to XML schema 100 have a defined order in which they are expected to appear in the document. Because of this, the database system expects to encounter each element in XML schema 100 in the listed order (e.g., Name should come before Street, Street should come before State, and State should come before Zip).

Now suppose that the content model for the U.S. Address complex type is changed to an "all" content model. The all content model indicates that all of the elements defined by the complex type in the XML schema need to be present in an XML document. Yet, the specific order in which the elements appear in the document is unimportant. For example, if the content model for the U.S. Address complex type is all, then an XML document listing the elements in any order, such as Zip, State, Name, and Street, is a valid document, because, even though they are not in the same order listed in the XML schema, all of the elements are present. In such a case, element ordering is unaffected since the actual ordering of the elements is unimportant in the XML documents.

Element Ordering is Unaffected

If ordering is unaffected, then at step 260 each change to the XML schema is translated by the database system into an evolution operation that acts on the base database structures. For example, the addition of City element 112 as shown in FIG. 1B results in the need to evolve the object-relational table corresponding to U.S. Address. In one embodiment, the schema evolution operations are handled by the existing object type infrastructure. Moreover, in one embodiment, an evolution operation can change multiple complex types in the same schema.

When the schema changes have been determined, the database system invokes low-level database instructions that cause the object relational table for U.S. Address to evolve by adding a City column. The evolution of the base database structures (e.g., by adding columns and attribute to the underlying object types) ensures that new instance XML documents that conform to the new schema can be stored in these structures. For example, after the evolution operation, when a new XML document is inserted into the database, it can include a City element. Moreover, the information associated with the City element is stored in the new City column created by the evolution operation in the corresponding U.S. Address table.

Element Ordering

If element ordering is affected by a schema evolution operation, then at step 250, the ordering for the elements is updated. The reason for doing this is to preserve the integrity of the existing XML documents. To understand how to update element ordering, a brief description of some of the features used to keep track of element ordering is discussed.

Positional Descriptor

When an instance XML document is stored in a database, the ordering of the XML elements within a parent XML element is stored implicitly in certain storage formats. For example, if an instance XML document is stored in a CLOB, the ordering of child XML elements of a parent XML element is implicitly available in the CLOB. However, if the instance XML document is stored in object-relational format, the element ordering information is stored by the database system in a separate column as a numerical value based on an element's location in an XML document. For example, to preserve ordering of the elements for each instance XML document, in one embodiment, the database system implements a separate column on disk called a positional descriptor (PD) column. In one embodiment, the PD column is automatically generated as part of an object-relational table for a complex type in an XML-based database. When an XML schema is defined, the elements and attributes of the schema are mapped to base database structures stored on disk. For example, the elements identified in the U.S. Address complex type in example XML schema code 100 are mapped to columns in a U.S. Address table stored on disk. Accordingly, in the U.S. Address table, each row in the PD column identifies the order in which elements appeared in the row's corresponding XML document.

Figure 3A:
FIG. 3A is a table illustrating a sample repository having a positional descriptor column.

FIG. 3 illustrates an object-relational table 300 based on the complex type contained in the XML schema code 100 illustrated in FIG. 1A. Object-relational table 300 has a Name column, a Street column, a State column, a Zip column, and a PD column 310. Each of the Name, Street, State, and Zip columns are generated based on the elements listed in XML schema code 100. The PD column maintains element ordering information about instance XML documents.

Kidnums

Within PD column 310, each row maintains an ordered list of numbers that reference the other columns or attributes in the object relational table. Those reference numbers define the ordering of elements in an XML document. Often those numbers are referred to as "kidnums." Kidnums are a well-known concept in the art. Kidnums are numbers that uniquely identify the position of an attribute/element in an XML document.

Conventionally, kidnums and what they represent are never stored on disk. Accordingly, in the past, kidnum values were inferred by the database system from an XML schema when it was loaded. For example, a database system would not store on disk the fact that kidnum 0 represents the Name element in the object relational table. Instead, when the schema is loaded, the database system simply traverses the schema and as it encounters elements in a complex type, it sequentially assigns a kidnum value to each detected element.

For example, analyzing the U.S. Address complex type illustrated in FIG. 1A, the database system would determine that the first element in complex type is Name. Accordingly, the corresponding Name column is assigned an initial kidnum value, such as "0". Subsequently, when an instance XML document containing a Name is shredded, a kidnum value of 0 is appended to the set of kidnum values in the PD column. In this way, the PD column indicates the ordering of elements in instance XML documents. Since Street is the second element discovered in the complex type of the schema, when the database system detects it, a corresponding column is assigned the kidnum value of 1. Therefore, whenever an XML document containing a Street is inserted into the database, kidnum 1 is appended to the list of kidnums in the PD column for that particular XML document. The kidnums, essentially, create an implicit element ordering system based on the schema structure and documents themselves.

To evaluate the order in which elements were extracted from an XML document, the database system can consult the PD column. For instance, in FIG. 3A, in the first row of the object-relational table 300, PD column 310 stores kidnums in the following order 0, 1, 2, and 3. This means that the corresponding instance XML document stored at this row had the elements listed in the following order: Name, Street, State, and Zip.

In the second row of the PD column, the kidnums are listed as 2, 1, 3, and 0. This indicates that the corresponding instance XML document for this row had the elements listed in a different order: State, Street, Zip, and Name. Basically, the PD column gives a compressed representation of the order in which elements were extracted from instance XML documents.

Update the Element Ordering After Schema Evolution

Figure 3B:
FIG. 3B is a table illustrating an updated repository after a schema evolution operation, according to an embodiment of the invention.

In an embodiment, when a schema evolution operation alters the ordering of elements in the XML schema, the underlying PD column also needs to be updated. Note that, in one embodiment, when a new element is added to an XML schema, a corresponding column or attribute is appended to the object relational table for that element. FIG. 3B illustrates updated object relational table 320 after its associated schema has been modified. Note that object-relational table 320 conforms to the new XML schema illustrated in FIG. 1B.

As described above in connection with FIG. 1B, new XML schema 110 was updated to include an optional City element 112. The optional City element 112 was inserted in the schema itself between the already existing Street and State elements as illustrated in FIGS. 1A and 1B. As discussed above the new XML schema is backward compatible with the old XML schema. Accordingly, the database system invokes low-level database instruction to update the base database structures. In this example, the result of the schema evolution operation is a City column appended to table 320.

Conventionally, when the new XML schema 110 is loaded by the database system, implicit kidnums are assigned to each of the columns in the new table 320. However, an analysis by the database system of the new XML schema discovers a discrepancy between the kidnums stored in the PD column and the implicit element ordering based on the XML schema. For example, the database system implicitly assigns kidnum 0 to the Name column, kidnum 1 to the Street column, and kidnum 2 to the City column. However, in the PD column all of the stored kidnum 2 correspond to the State column. Hence, the implicit kidnum values do not accurately reflect the correct order of elements in an XML document.

To overcome this problem, in one embodiment, the database system stores on disk the current kidnums that have been assigned to columns in a table. Then, the database system generates a new kidnum value for the new column.

In one embodiment, the new column gets a kidnum value that is different from any other currently assigned kidnum associated with a complex type. According to one embodiment, the new kidnum value is simply the highest currently assigned kidnum, within the complex type, plus one (e.g., [highest kidnum]+1). Note that assigning kidnum values in this way moves the database system away from following the implicit assignment of kidnums. However, storing the kidnums assignments on disk requires a very small amount of storage space, so storing the kidnum information negligibly impacts the overall performance of the database system. Moreover, the amount of processing saved storing the kidnums on disks generally outweighs the storage costs.

Example Procedure for generating a Kidnum

Figure 4:
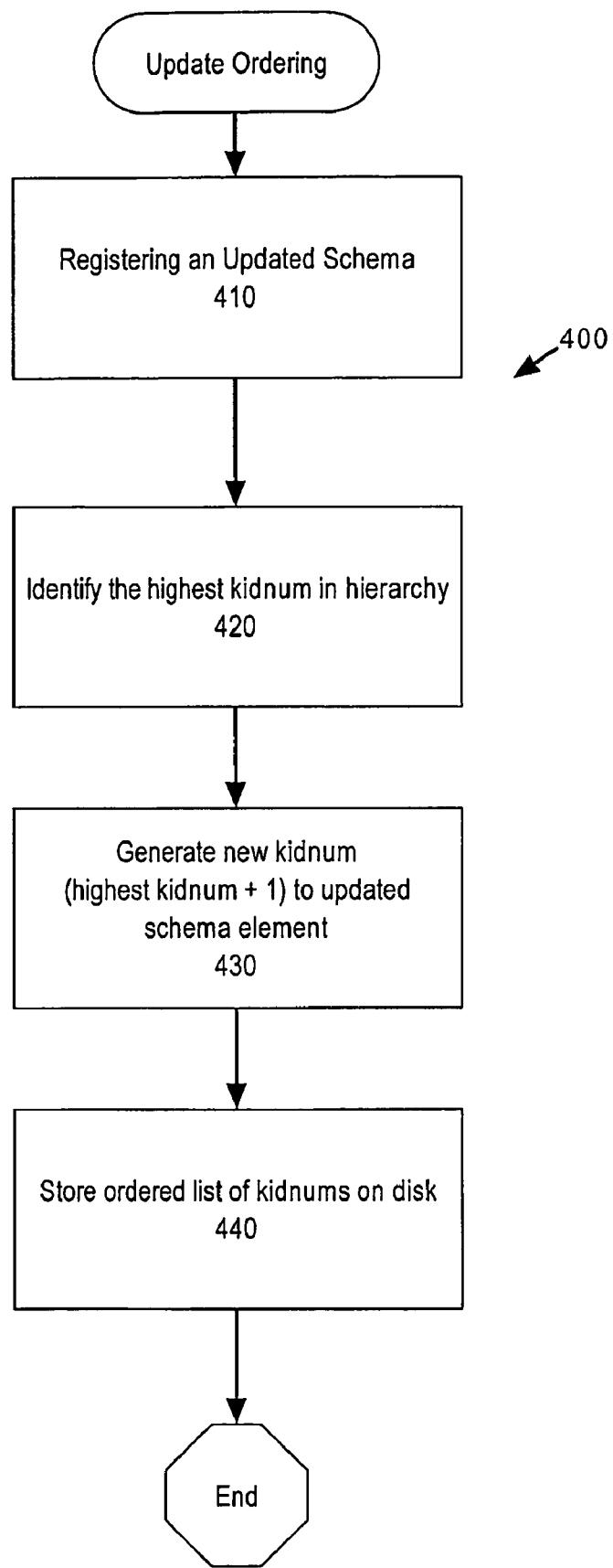
FIG. 4 is a flowchart illustrating steps to store the order of elements in an XML document on disk, according to an embodiment.

FIG. 4 is a flowchart illustrating a procedure that updates the ordering of elements in an object relational table even after new elements have been added to a schema. In one embodiment, the procedure 400 does so by identifying an appropriate kidnum value for the updated elements.

Receive Request to Perform Schema Evolution

In FIG. 4, at step 410, a database system receives a request to perform a schema evolution operation that is backward compatible with the existing instance XML documents. In addition, the schema evolution operation introduces a new element in the schema that alters the flow of elements in the schema.

For example, suppose the database system receives a request to update XML schema code 100 illustrated in FIG. 1A. The request updates the schema to the XML schema code 110 illustrated in FIG. 1B. As discussed above, the new XML schema includes a new City element in the U.S. Address complex type. Accordingly, a base database structure is added to the table containing the U.S. Address. In one embodiment, the addition of the City column generates an object-relational table like the one 320 illustrated in FIG. 3B, which includes a PD column and a City column appended to the end of the table. According to one embodiment, the addition of the City element to the XML schema 110 creates an element ordering problem as described above.

Identify Highest Kidnum in a Type Hierarchy

To avoid recalculating the set of kidnums in the PD column, at step 420, the database system stores the kidnums on disk and then identifies the highest kidnum value in the complex type hierarchy. A complex type hierarchy basically refers to the XML schema concept that one complex type may inherit attributes and elements from another complex type. For instance, the U.S. Address complex type may inherit from a more generic complex type simply called Address. The Address type maintains certain attributes common to addresses anywhere in the world, such as name, street, and city. Inheriting from Address means that the U.S. Address complex type includes elements and attributes from Address. In addition, the U.S. Address complex type may also define certain specific elements and attributes that are unique to a U.S. Address, such as state and zip code.

Typically, each type within a hierarchy maintains its own set of kidnums. However, because some elements may be inheritable, the database system selects a kidnum value that avoids compatibility issues with kidnums in the entire complex type hierarchy. For example, in one embodiment, the database system analyzes the old XML schema and counts up the total number of elements and attributes in a given complex type hierarchy. For example, if the Address complex type had 6 elements and the U.S. Address complex type that inherits from Address has 10 values, then the total number of elements is summed together to create a base kidnum value. The new element is assigned a value based on the base kidnum value, e.g., base kidnum value+1. Alternatively, a different technique may be used to determine a base kidnum value.

Generate New Kidnum for Updated Schema Elements

At step 430, the updated schema elements are assigned a kidnum value. For example, in one embodiment, the kidnum for each updated elements is the base kidnum value plus one. Alternatively, it may be a different algorithm may be used to assign a kidnum value. By making this assignment, the database system ensures that the new element is assigned a value that is not in use by another element in the complex type hierarchy.

Store Kidnums of Disk

At step 440, the new kidnum values and their mappings to columns in the table are stored on disk. Because schema evolution can introduce new elements in the middle of a complex type and, thereby, change the way implicit kidnum assignments are made, the database system, according to one embodiment, stores the kidnum-to-element mappings on disk after a schema evolution operation occurs.

According to one embodiment, storing kidnums on disk includes creating a unique mapping between elements and kidnums. One way is to maintain a list, table, or some other structure of kidnums with their associated column. In one embodiment, an annotation that maps propnums to kidnums may be used to store the kidnum-to-element mappings on disk.

Propnum

A propnum is a well-known number or identifier that some database systems assign to every XML element and attribute when they are first detected in a document. The reason for a propnum is so the database system can differentiate between two elements of the same name but of different types. For example, in the U.S. Address complex type an element may be called Name, and there may be another complex type called person that also includes an element called Name. The propnums provide a mechanism for the database system to differentiate between the two.

The propnums are typically system wide, meaning they are unique to the entire database system and not to just one repository or table within the system. By mapping kidnums to propnums, in one embodiment, the database system can keep track of each element in a schema. In one embodiment, the kidnum to propnum mapping is maintained as an annotation to the schema.

An annotation is an XML schema standard way of putting in application specific information or user specific information associated with a complex type. An annotation can be added after the fact, but once added it becomes part of the XML schema.

FIG. 5 illustrates an example annotation to an XML schema to help maintain the proper ordering of elements in the document. Note that the annotation does not effect the corresponding PD column that maintains the element ordering for each XML document stored in the database. The annotation provides a way to explicitly maintain the kidnum-to-element mappings.

For example, as illustrated in FIG. 5, as a matter of course, each element in an XML schema 500 is assigned a propnum when it is registered with a database system. In one embodiment, the propnums may be manually assigned at the time a schema is registered or alternatively, they may be automatically determined by the database system.

As illustrated, the XML schema 500 can be annotated to explicitly map an element to a kidnum. For example, suppose the database system automatically assigns propnums when an element in the XML schema 500 is registered with the database system. Accordingly, in XML schema 500, the element "Name" is assigned a propnum of 2653 when the XML schema 500 is registered with a database system.

The way the database system stores the kidnum-to-element mapping is then to annotate the XML schema. For example, in the XML schema 500, an annotation is added to the XML schema code to map propnum 2653 (the propnum for the Name element) to kidnum '0'. This annotation indicates that a kidnum 0 in a PD column refers to the Name column associated with the U.S. Address complex type. Similar annotated mappings have been made for the Street element, State element, and Zip element.

Now, suppose that the XML schema 500 is updated to add a new element, such as City element. Accordingly, the City element is added to the schema. When the new schema is registered, the City element is assigned a propnum of 2681 by the database system.

To create a proper kidnum-to-element mapping, in one embodiment, the annotation to XML schema 500 is examined to determine what kidnums have been assigned to other elements in the U.S. Address complex type. According to one embodiment, the database system may also look at the complex type hierarchy to determine the highest total kidnum value in the complex type hierarchy to determine a base kidnum value.

In FIG. 5, before the addition of the City element to the XML schema 500, the highest kidnum value is 4. It is assigned to propnum 2652 (e.g., the country attribute). If kidnum 4 is the highest number in the hierarchy then the kidnum base value becomes four. Accordingly, the new City element is assigned the next highest kidnum, 5. Then, a mapping statement is added to the annotation section of the XML schema code 500. A PD column for a database conforming to this particular XML schema 500 can reference the annotation section to determine what kidnum value describes what element in associated XML documents.

By storing the kidnum-to-element mappings in an annotation, kidnums can be meaningfully interpreted irrespective of the fact that the City element gets added as the third child during a schema evolution process. In this way, the execution time for performing schema evolutions on a backward compatible schema may be performed independent of the number of XML documents in the associated database.

Hardware Overview

Figure 6:
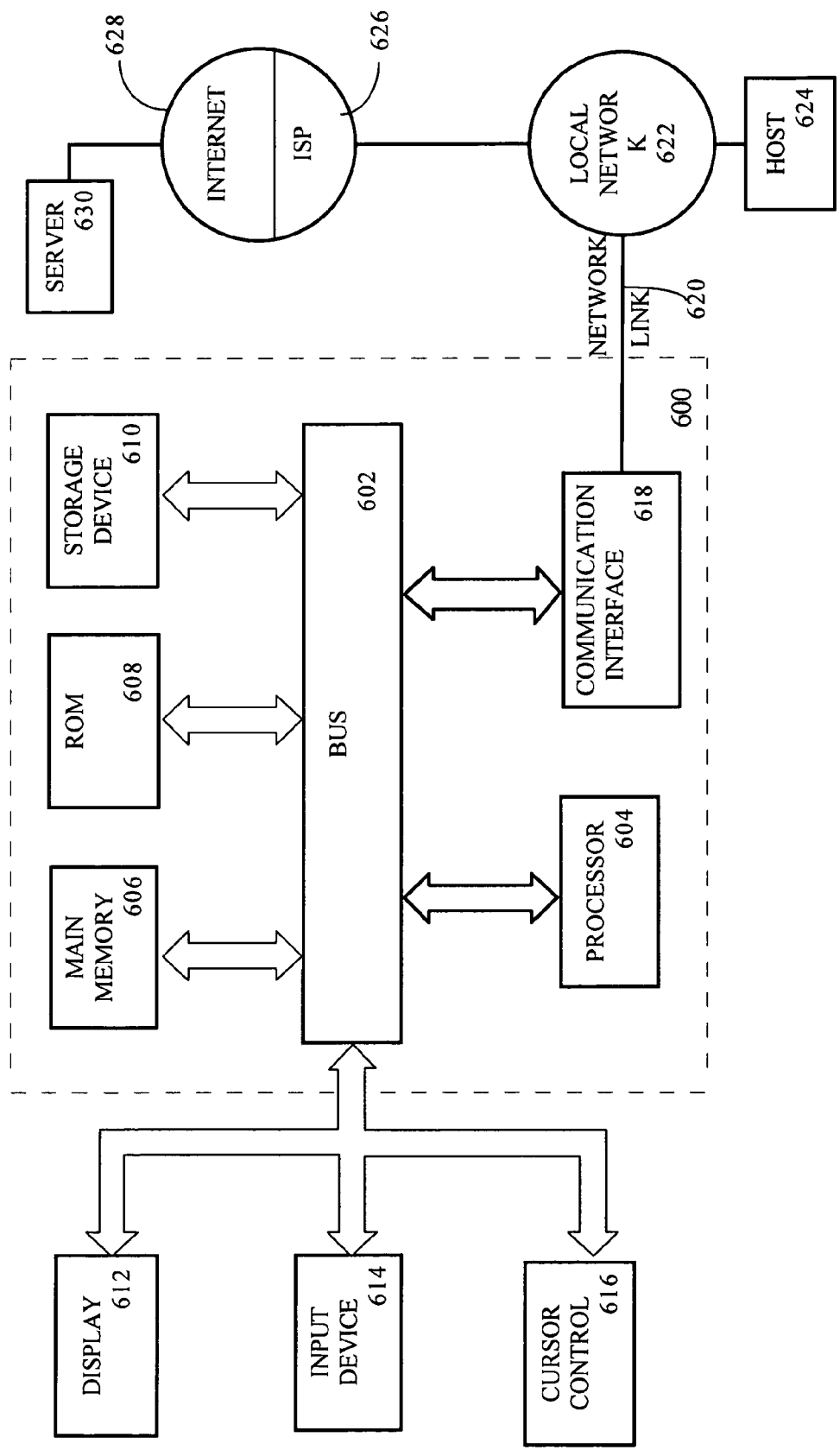
FIG. 6 is block diagram of a computer system upon which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one implementation of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative implementations, hard-wired circuitry may be used in place of or in combination with software instructions to implement the invention. Thus, implementations of the invention are not limited to any specific combination of hardware circuitry and software.

The term "machine-readable medium" as used herein refers to any medium that participates in providing data that causes a machine to operation in a specific fashion. In an implementation implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A computer-implemented method for modifying an existing XML schema in a database without modifying existing data that conforms to the existing XML schema in the database, the method comprising:
    storing data from a set of XML documents in base database structures in a database according to an XML schema, wherein the XML schema defines an XML structure for said set of XML documents;
    after storing the data from the set of XML documents in the base database structures, receiving a request to make one or more changes to the schema;

determining that the schema, if modified by the one or more changes, would be compatible with the stored data; and wherein the step of determining that the schema, if modified by the one or more changes, would be compatible with the stored data comprises one or more of:
   (a) determining that the one or more changes comprise an addition of a new element to the schema, and determining that the data stored in the base database structures in the database would be compatible with the schema as modified to add the new element;
   (b) determining that the one or more changes comprise a removal of an element from the schema, and determining that the data stored in the base database structures in the database would be compatible with the schema as modified to remove the element; or
   (c) determining that the one or more changes affect the ordering of elements within the schema, and determining that the data stored in the base database structures in the database would be compatible with the schema as modified to affect the ordering of elements within the schema; and in response to determining that the schema, if modified by the one or more changes, would be compatible with the stored data, modifying the base database structures in the database to reflect the changes to the schema without modifying the data from the set of XML documents that is stored in the base database structures;

wherein the method is performed by one or more computing devices.

2. The method of claim 1, wherein a database structure of said base database structures includes a positional descriptor column.

3. The method of claim 2, wherein the positional descriptor column stores a set of kidnum values in an ordered list, wherein each kidnum in the set of kidnum values is uniquely mapped to an attribute in a set of attributes.

4. The method of claim 1, wherein modifying the base database structures in the database to reflect the changes to the schema comprises updating the element ordering in the base database structures in the database, and wherein the updated element ordering is added to the schema as an annotation.

5. The method of claim 3, wherein each kidnum in the set of kidnum values is mapped to a propnum.

6. The method of claim 1, wherein receiving the request to make one or more changes to the schema includes receiving a request to add a new element to the schema, and wherein the step of determining that the schema, if modified by the one or more changes, would be compatible with the stored data comprises (a) determining that the one or more changes comprise an addition of the new element to the schema, and determining that the data stored in the base database structures in the database would be compatible with the schema as modified to add the new element.

7. The method of claim 6, further comprising determining a kidnum value for the new element.

8. The method of claim 7, wherein the kidnum value for the new element comprises a value greater than the highest kidnum value associated with a kidnum value for each attribute in a set of attributes.

9. The method of claim 7, wherein the kidnum value for the new element comprises a value greater than the highest kidnum value associated with a kidnum value for each attribute in a set of attributes associated with a complex type hierarchy.

10. The method of claim 1, wherein determining that the data stored in the base database structures in the database would be compatible with the schema, if modified by the one or more changes, includes identifying whether the modification to the schema executes in constant time.

11. A non-transitory computer-readable storage medium storing one or more sequences of instructions which, when executed by one or more processors, causes the one or more processors to modify an existing XML schema in a database without modifying existing data that conforms to the existing XML schema in the database by performing the steps of:
   storing data from a set of XML documents in base database structures in a database according to an XML schema, wherein the XML schema defines an XML structure for said set of XML documents;
   after storing the data from the set of XML documents in the base database structures, receiving a request to make one or more changes to the schema;
   determining that the schema, if modified by the one or more changes, would be compatible with the stored data; and
   wherein the step of determining that the schema, if modified by the one or more changes, would be compatible with the stored data comprises one or more of:
      (a) determining that the one or more changes comprise an addition of a new element to the schema, and determining that the data stored in the base database structures in the database would be compatible with the schema as modified to add the new element;
      (b) determining that the one or more changes comprise a removal of an element from the schema, and determining whether the data stored in the base database structures in the database would be compatible with the schema as modified to remove the element; or
      (c) determining that the one or more changes affect the ordering of elements within the schema, and determining whether the data stored in the base database structures in the database would be compatible with the schema as modified to affect the ordering of elements within the schema; and
   in response to determining that the schema, if modified by the one or more changes, would be compatible with the stored data, modifying the base database structures in the database to reflect the changes to the schema without modifying the data from the set of XML documents that is stored in the base database structures.

12. The computer-readable storage medium of claim 11, wherein a database structure of said base database structures includes a positional descriptor column.

13. The computer-readable storage medium of claim 12, wherein the positional descriptor column stores a set of kidnum values in an ordered list, wherein each kidnum in the set of kidnum values is uniquely mapped to an attribute in a set of attributes.

14. The computer-readable storage medium of claim 11, wherein the step of modifying the base database structures in the database to reflect the changes to the schema comprises updating the element ordering in the base database structures in the database, and wherein the updated element ordering is added to the schema as an annotation.

15. The computer-readable storage medium of claim 13, wherein each kidnum in the set of kidnum values is mapped to a propnum.

16. The computer-readable storage medium of claim 11, wherein receiving the request to make one or more changes to the schema includes receiving a request to add a new element to the schema, and wherein the step of determining that the schema, if modified by the one or more changes, would be compatible with the stored data comprises (a) determining that the one or more changes comprise an addition of the new element to the schema, and determining that the data stored in the base database structures in the database would be compatible with the schema as modified to add the new element.

17. The computer-readable storage medium of claim 16, wherein the one or more sequences of instructions, when executed by the one or more processors, further cause the one or more processors to perform determining a kidnum value for the new element.

18. The computer-readable storage medium of claim 17, wherein the kidnum value for the new element comprises a value greater than the highest kidnum value associated with a kidnum value for each attribute in a set of attributes.

19. The computer-readable storage medium of claim 17, wherein the kidnum value for the new element comprises a value greater than the highest kidnum value associated with a kidnum value for each attribute in a set of attributes associated with a complex type hierarchy.

20. The computer-readable storage medium of claim 11, wherein determining that the data stored in the base database structures in the database would be compatible with the schema, if modified by the one or more changes, includes identifying whether the modification to the schema executes in constant time.

21. The method of claim 1, wherein the step of determining that the schema, if modified by the one or more changes, would be compatible with the stored data comprises (b) determining that the one or more changes comprise a removal of an element from the schema, and determining that the data stored in the base database structures in the database would be compatible with the schema as modified to remove the element.

22. The method of claim 1, wherein the step of determining that the schema, if modified by the one or more changes, would be compatible with the stored data comprises (c) determining that the one or more changes affect the ordering of elements within the schema, and determining that the data stored in the base database structures in the database would be compatible with the schema as modified to affect the ordering of elements within the schema.

23. The computer-readable storage medium of claim 11, wherein the step of determining that the schema, if modified by the one or more changes, would be compatible with the stored data comprises (b) determining that the one or more changes comprise a removal of an element from the schema, and determining that the data stored in the base database structures in the database would be compatible with the schema as modified to remove the element.

24. The computer-readable storage medium of claim 11, wherein the step of determining that the schema, if modified by the one or more changes, would be compatible with the stored data comprises (c) determining that the one or more changes affect the ordering of elements within the schema, and determining that the data stored in the base database structures in the database would be compatible with the schema as modified to affect the ordering of elements within the schema.

* * * * *

UNITED STATES PATENT AND TRADEMARK OFFICE
CERTIFICATE OF CORRECTION

| | | |
|---|---|---|
| PATENT NO. | : 7,870,163 B2 | |
| APPLICATION NO. | : 11/540341 | |
| DATED | : January 11, 2011 | |
| INVENTOR(S) | : Abhyudaya Agrawal et al. | |

It is certified that error appears in the above-identified patent and that said Letters Patent is hereby corrected as shown below:

On the Title Page Item (56), under "Other Publications", line 4, delete "Unkwown" and insert -- Unknown --, therefor.

On Title page 2, Item (56), under "U.S. Patent Documents", line 2, delete "6,523,036  2/2003  Hickman et al.  1/1" and insert -- 6,523,036  2/2003  Hickman et al.  707/704 --, therefor.

On Title page 2, Item (56), under "Other Publications", line 18, delete "Obejcts" and insert -- Objects --, therefor.

In column 9, line 66, delete "saved storing" and insert -- saved by storing --, therefor.

In column 11, line 8, delete "of" and insert -- on --, therefor.

In column 11, line 34, delete "person" and insert -- Person --, therefor.

Signed and Sealed this

Thirteenth Day of September, 2011

David J. Kappos
*Director of the United States Patent and Trademark Office*